United States Patent [19]
Watanabe et al.

[11] Patent Number: 6,056,694
[45] Date of Patent: May 2, 2000

[54] WAVE RECEIVING APPARATUS AND ULTRASONIC DIAGNOSTIC APPARATUS

[75] Inventors: Kazuhiro Watanabe; Akira Shiba, both of Kawasaki, Japan

[73] Assignee: Fujitsu Limited, Kawasaki, Japan

[21] Appl. No.: 08/892,242

[22] Filed: Jul. 14, 1997

[30] Foreign Application Priority Data

Mar. 17, 1997 [JP] Japan ............................ 9-063235

[51] Int. Cl.7 .................................................. A61B 8/00
[52] U.S. Cl. ............................................................. 600/447
[58] Field of Search .................................... 600/443, 447; 73/625, 602, 626; 342/195; 367/7, 11

[56] References Cited

U.S. PATENT DOCUMENTS

| | | | |
|---|---|---|---|
| 4,604,626 | 8/1986 | Stromswold | 343/417 |
| 4,644,795 | 2/1987 | Augustine | 73/625 |
| 5,129,399 | 7/1992 | Hirama | 600/447 |
| 5,278,757 | 1/1994 | Hoctor et al. | 600/463 |
| 5,345,539 | 9/1994 | Webb | 395/22 |
| 5,349,359 | 9/1994 | Dallaire et al. | 342/195 |
| 5,404,148 | 4/1995 | Zwarts | 343/776 |
| 5,501,220 | 3/1996 | Foster | 600/447 |
| 5,511,423 | 4/1996 | Sugiyama et al. | 73/602 |
| 5,647,365 | 7/1997 | Abboud | 600/447 |
| 5,682,922 | 11/1997 | Stankwitz et al. | 342/196 |

*Primary Examiner*—Francis J. Jaworski
*Attorney, Agent, or Firm*—Staas & Halsey

[57] ABSTRACT

A wave receiving apparatus has: a receiver unit for receiving a wave arrived at a predetermined aperture together with information as to a position inside the aperture; a weighting processing unit for performing a weighting processing for received signals derived in the receiver unit with a plurality of types of weighting functions where a position inside the aperture is given in the form of a variable; and an arithmetic unit for performing an operation including an arithmetic operation in which a travelling direction of the wave arrived at the aperture, or a position of a generating source of the wave is evaluated in accordance with a plurality of weighted received signals derived through the weighting processing of the weighting processing unit.

1 Claim, 13 Drawing Sheets

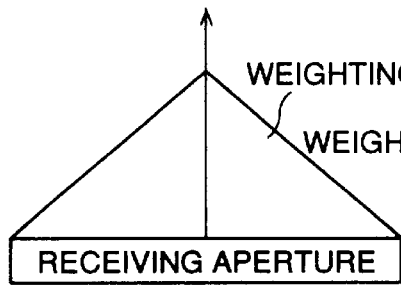
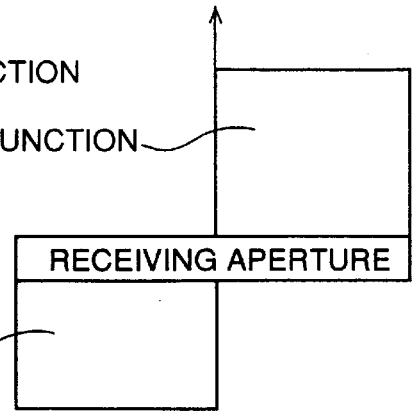
Fig.10(a)　　　Fig.10(b)
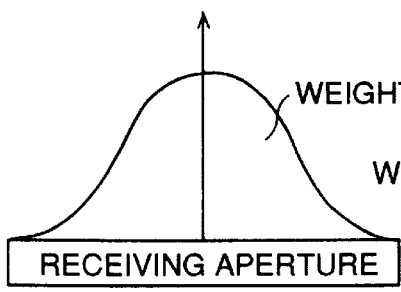
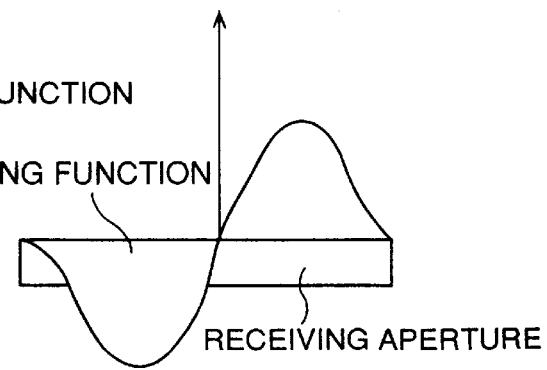
Fig.11(a)　　　Fig.11(b)

WAVE RECEIVING APPARATUS AND ULTRASONIC DIAGNOSTIC APPARATUS

BACKGROUND OF THE INVENTION

1. Field of the Invention

The present invention relates to a wave receiving apparatus for receiving and processing waves, such as acoustic waves (including ultrasounds and vibration), and electromagnetic waves, and an ultrasonic diagnostic apparatus which is one application field of the wave receiving apparatus.

2. Description of the Related Art

Hitherto, a wave receiving apparatus for receiving and processing waves has been generally adopted. An ultrasonic diagnostic apparatus is one application field of the wave receiving apparatus. As other examples of the application, there are widely known a radar for detecting the position of airplanes or the like in the air, a fish detector for detecting the position of fishes in the water, a marine seismic profiling system, and a flaw detector for detecting flaws inside an object.

Here, an ultrasonic diagnostic apparatus is referred to, by way of example, from among those various applications. The earlier technology thereof will be described hereinafter.

The ultrasonic diagnostic apparatus is well known as a system in which mainly a human body is offered as the subject. A process in which ultrasound is transmitted to the inside of the subject and ultrasounds reflected by the surfaces of various tissues inside the subject are received is sequentially repeated to scan the inside of the subject with ultrasounds. By this process, an image inside the subject is displayed on the basis of received signals derived through the scanning process, thereby contributing to diagnosis of illness such as diseases of the viscus inner organs.

FIGS. 19(a)–(c) are illustrations useful for understanding a state in which an ultrasonic diagnostic apparatus is used to obtain an image of a target (an ultrasound reflector) within the subject.

The ultrasonic diagnostic apparatus is provided with, as shown in FIG. 19(a), a large number of ultrasonic transducers 1 arranged in a predetermined direction (horizontal direction of FIG. 19(a)). These ultrasonic transducers 1 are applied to a body surface of the subject to transmit ultrasonic pulses toward the inside of the subject. The pulses are transmitted by means of driving with electric pulses a plurality of ultrasonic transducers included in a certain aperture 2 set up for receiving ultrasounds of one timing. An ultrasonic beam 4 having a directivity is formed within the subject in such a manner that when ultrasounds are transmitted, timings for driving the plurality of ultrasonic transducers included in the aperture 2 are controlled. In addition a drive intensity for driving each of the plurality of ultrasonic transducers is controlled in accordance with a predetermined weighting function 3. In the weighting function 3, an arrangement position (an arrangement sequence) of the plurality of ultrasonic transducers included in the aperture 2 is given in the form of a variable.

Ultrasounds reflected within the subject and returned are received by the plurality of ultrasonic transducers constituting the aperture 2, respectively. The received signals are amplified in accordance with the associated weighting functions 3, respectively, while beamformed so as to emphasize the ultrasonic reflection signal in the direction along the ultrasonic beam 4 extending into the inside of the subject. This is referred to as "the received beam is formed". On the other hand, the ultrasonic beam transmitted to the inside of the subject is referred to as the transmitted beam. The beamforming process is referred to as a phasing addition and is a well known technology. Thus, in this respect, a redundant description will be omitted.

Such a process of transmission and reception for ultrasounds is repeatedly performed while the aperture 2 is sequentially shifted in a direction of an arrangement of the ultrasonic transducers 1. A process such that while the aperture 2 is sequentially shifted, the process of transmission and reception for ultrasounds is repeatedly performed, is referred to as a scan.

It is noted that, for the purpose of simplification of the explanation, the above explanation has been made without especial distinctions between the transmission aperture and the reception aperture; the weighting function for transmission and the weighting function for reception; and the transmitted beam and the received beam. However, it is acceptable that they are different from one another between the transmitting end and the receiving end. They may be suitably set up in the transmitting end and the receiving end, respectively.

It is possible to obtain images within the subject by means of displaying the intensity of the signals representative of a plurality of received beams, which are obtained through the above-mentioned scan process, in the form of luminance. Now consider a case where only one target exists within the subject. In view of the fact that the ultrasonic beam 4 (both the received beam and the transmitted beam) has a directivity, the intensity of the received signal on each of the apertures set up in the scan process offers the respective value as shown in FIG. 19(b). The distribution of intensity of those signals is referred to as a beam profile.

FIG. 19(c) shows an image (a target image) in which the received signals having such a signal intensity distribution are represented by a luminance.

While a resolution of the ultrasonic diagnostic apparatus is better with smaller target images, usually, a size of the target image is significantly expanded as compared with the target 5 itself.

Hitherto, the distribution of intensity of received signals, which determines a size of the target image, that is, the beam profile, is determined in accordance with a size of the aperture 2, the weighting function 3 and a wavelength x of the ultrasounds to be transmitted and received. Also, it has been devised that those elements are set optimally. However, there is a limit in improvement of the resolution.

Further, in a case where a position of the target 5 is determined, a position of the target 5 as to the arrangement direction of the ultrasonic transducers 1 only can be determined, when the subject is scanned to determine the peak of intensity of the received signals. For example, it may happen that the ultrasonic beam 4 is biased with respect to the target 5 as shown in FIG. 19(a). In such a case, even if a sufficient signal intensity of received signals is obtained through the reflected ultrasounds from the target 5, it has been impossible to determine a displacement or a direction (an angle) of the target 5 through one ultrasonic transmission and reception process.

Furthermore, with respect to the detection of the position of the target, intervals of the apertures, are sequentially set up when scanned. If these intervals are rough, so that the apertures are set up merely at intervals with respect to the horizontal direction of FIG. 19(a) for instance, it is impossible to detect the true peak. This involves a decline in the detection accuracy for a position of the target. On the other hand, intervals of the apertures may be set up to be fine in order to attain a sufficient accuracy in the position detection of the target, In this case, there is a need to perform ultrasonic transmission and reception processes a large number of times by the number of times corresponding to a number of apertures set up on a fine basis. Thus, it takes a lot of time for scanning the subject once. This involves a decline in the frame rate.

While the above explanation has been made exemplarily for the ultrasonic diagnostic apparatus, the above-mentioned problems are not ones involved in only the ultrasonic diagnostic apparatus. Rather, these are common problems for all of the apparatuses in which waves are received to detect a position or the like of the target. Further, the above-mentioned problems are common problems for not only a case where a target, which reflects waves, is offered as the object, but also an apparatus for detecting a position of a target which generates per se waves such as acoustic wave, electromagnetic wave and the like.

SUMMARY OF THE INVENTION

In view of the foregoing, it is therefore an object of the present invention to provide a wave receiving apparatus capable of detecting a target without scanning direction and position thereof, or improving the spatial resolution, and an ultrasonic diagnostic apparatus which is one application field of the wave receiving apparatus.

FIG. 1 is a block diagram useful for understanding a principle of a wave receiving apparatus according to the present invention.

A wave receiving apparatus according to the present invention comprises a receiver unit 10, a weighting processing unit 20 and an arithmetic unit 30.

The receiver unit 10 receives a wave arrived at a predetermined aperture a together with information as to a position inside the aperture. For receiving a wave, it is acceptable that a plurality of receiving elements are arranged to obtain information as to a position inside the aperture on the basis of an arrangement order of the plurality of receiving elements. Alternatively, it is acceptable that, for example, one receiving element is sequentially moved in the aperture to receive a wave, thereby to obtain information as to a position inside the aperture on the basis of a movement position of such a single receiving element. Further, regarding the position information in the aperture, it is acceptable that, for example, a plurality of receiving elements are arranged on a one-dimensional basis so as to obtain a one-dimensional position information according to an arrangement order of the plurality of receiving elements. Alternatively it is acceptable that a plurality of receiving elements are arranged on a two-dimensional basis so as to obtain a two-dimensional position information according to an arrangement order of the plurality of receiving elements.

The weighting processing unit 20 performs a weighting processing for received signals derived in said receiver unit 10 with a plurality of types of weighting functions where a position inside the aperture a is given in the form of a variable.

While the plurality of types of weighting functions are not restricted to specific weighting functions, it is not permitted that they are any types of weighting functions randomly selected. In the weighting processing unit 20, there is a need to perform a weighting processing for received signals derived in said receiver unit 10 with a plurality of types of weighting functions which are in such a relation that the arithmetic unit 30 is able to determine a travelling direction of the wave, or a position of a generating source of the wave. Specifically, the weighting processing unit 20 may perform the weighting processing with an even function and an odd function where a position in the aperture is given in the form of a variable. Alternatively the weighting processing unit 20 may perform the weighting processing with a first function where a position in the aperture is given in the form of a variable and a second function where the first function is given in the form of the variable and subjected to n-th (n is a positive integer not less than 1) order differentiation.

As examples of the even function and the odd function, there is cited a rectangular function (cf. FIG. 4) of bilateral symmetry with respect to the center of the receiving aperture, and a rectangular function (cf. FIG. 6) of bilateral symmetry with respect to the center of the receiving aperture, but different in sign from one another, respectively. As examples of the first function, there is cited a triangular function (cf. FIG. 10(a)) in which the maximum is given at the center of the aperture, be gradually decreased toward both the ends of the aperture, and finally becoming zero at both the ends of the aperture, Gaussian function in which the maximum is given at the center of the aperture, the raised cosine in which the maximum is given at the center of the aperture, the offset raised cosine in which the maximum is given at the center of the aperture, and the like. As examples of the second function, there is cited functions in which the first function is subjected to the first order differentiation or the second order differentiation.

The arithmetic unit 30 performs an operation including an arithmetic operation in which a travelling direction of the wave arrived at the aperture, or a position of a generating source of the wave is evaluated in accordance with a plurality of weighted received signals derived through the weighting processing of said weighting processing unit 20.

In this case, it is acceptable that the wave generating source is one for generating a wave travelling toward the aperture by means of reflecting the wave coming to the wave generating source, alternatively the wave generating source per se generates waves.

To determine the travelling direction of the wave or the position of the wave generating source, the arithmetic unit 30 performs, for example, an arithmetic operation for deriving a ratio of the plurality of weighted received signals.

Further, it is preferable that the arithmetic unit 30 performs an operation including an arithmetic operation for obtaining a receiving view angle narrower than that obtained by one of the plurality of weighted received signals.

FIG. 2 is an explanatory illustration useful for understanding a receiving unit of a wave receiving apparatus according to the present invention.

The receiving unit 10 of a wave receiving apparatus according to the present invention receives, as shown in FIG. 2, a wave arrived in a plurality of apertures a1, a2, a3, . . . , sequentially or simultaneously. The plurality of apertures are laid to spatially partially overlap each other. The weighting processing unit 20 performs a weighting processing for received signals derived through the plurality of apertures a1, a2, a3, . . . , with a plurality of types of weighting functions. The arithmetic unit 30 performs an operation including an arithmetic operation in which a travelling direction of the wave arrived at each of the apertures a1, a2, a3, . . . , an, or a position of a generating source of the wave is evaluated, and in addition generates an image signal representative of an image based on an operating result obtained as to the plurality of apertures a1, a2, a3, . . . , an.

In this case, it is preferable that there is provided an image display unit 40 for displaying an image based on the image signal generated in the arithmetic unit 30.

Further, in the wave receiving apparatus according to the present invention, it is also preferable that the receiving unit 10 receives a wave arrived in a plurality of apertures sequentially or simultaneously, the plurality of apertures being laid to spatially partially overlap each other;

the weighting processing unit 20 performs a weighting processing for received signals derived through the plurality of apertures with a plurality of types of weighting functions; and the arithmetic unit 30 performs an operation including an arithmetic operation in which a travelling direction of the wave arrived at each of the apertures, or a position of a generating source of the wave is evaluated, and in addition generates an interpolation signal corresponding to a received signal derived when a wave arrived at an intermediate position of aperture between adjacent two apertures is received at a predetermined receive view angle.

In the wave receiving apparatus of the present invention, the receiving unit 10 receives anyone of acoustic waves including, for example, ultrasounds and vibrations travelled, and electromagnetic waves spatially travelled.

FIG. 3 is a block diagram useful for understanding a principle of an ultrasonic diagnostic apparatus according to the present invention.

There is provided an ultrasonic diagnostic apparatus in which ultrasounds transmitted into the subject and returned through a reflection within the subject are received by a plurality of ultrasonic transducers in an aperture set up, of a plurality of ultrasonic transducers arranged in a predetermined arrangement direction, so that received signals are derived, this process is repeated by a plurality of number of times while the aperture is sequentially moved in the arrangement direction, an image signal representative of an image within the subject is derived on the basis of the received signals obtained while this process is repeated a plurality of number of times, and an image based on the image signal is displayed, said ultrasonic diagnostic apparatus comprising:

a receiving unit 11 for receiving ultrasound arrived at a set up aperture a with a plurality of ultrasonic transducers 1 in the aperture;

a weighting processing unit 21 for performing a weighting processing for received signals derived in said receiver unit 11 with a plurality of types of weighting functions where an arrangement order of the plurality of ultrasonic transducers 1 in the aperture is given in the form of a variable;

an arithmetic unit 31 for performing an operation including an arithmetic operation in which direction or position of an ultrasonic reflection source within the subject is evaluated in accordance with a plurality of weighted received signals derived through the weighting processing of said weighting processing unit 21, and in addition generates an image signal representative of an image within the subject based on an operating result obtained while said process is repeated; and an image display unit 41 for displaying an image based on the image signal generated in said arithmetic unit 31.

BRIEF DESCRIPTION OF THE DRAWINGS

FIGS. 10(a) and (b) are each a chart showing a second example of a weighting function pair;

FIGS. 11(a) and (b) are each a chart showing a third example of a weighting function pair;

DESCRIPTION OF THE PREFERRED EMBODIMENTS

Hereinafter, there will be described embodiments of the present invention, taking as a main part, first, an ultrasonic diagnostic apparatus which is one application field of the wave receiving apparatus.

Figure 19A:
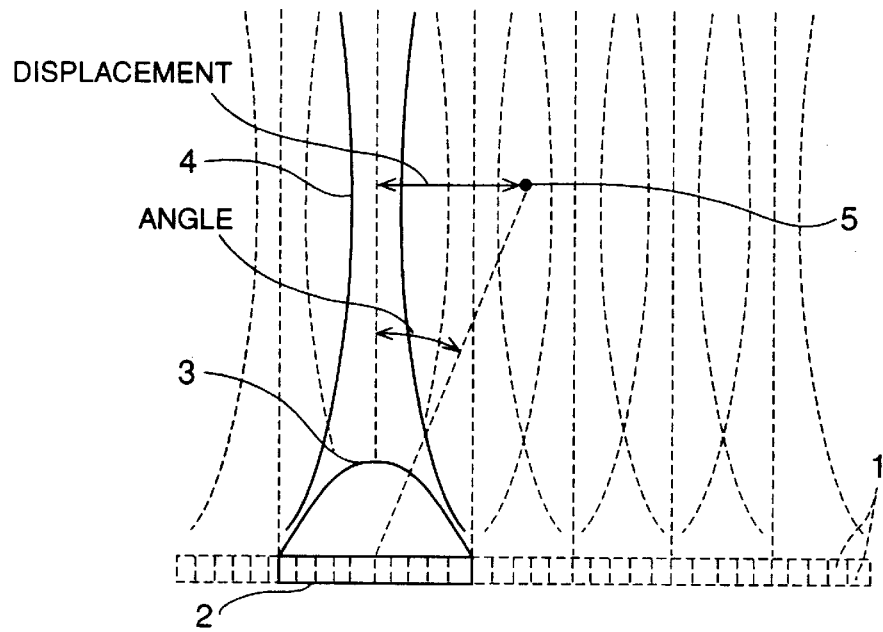
FIGS. 19(a)–(c) are illustrations useful for understanding a state in which an ultrasonic diagnostic apparatus is used to obtain an image of a target (an ultrasound reflector) within the subject.
Figure 19B:
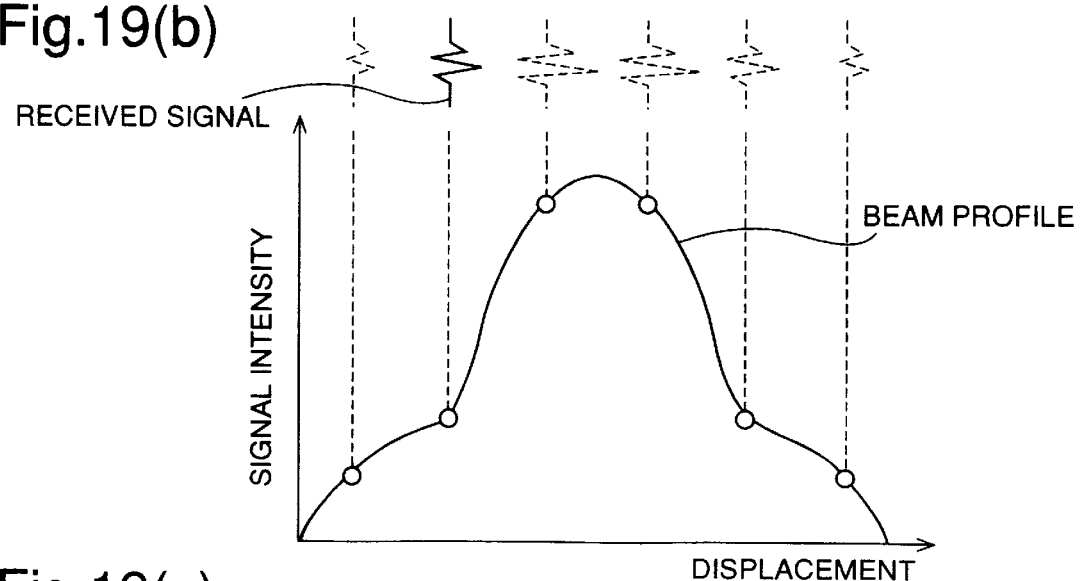
Figure 19C:
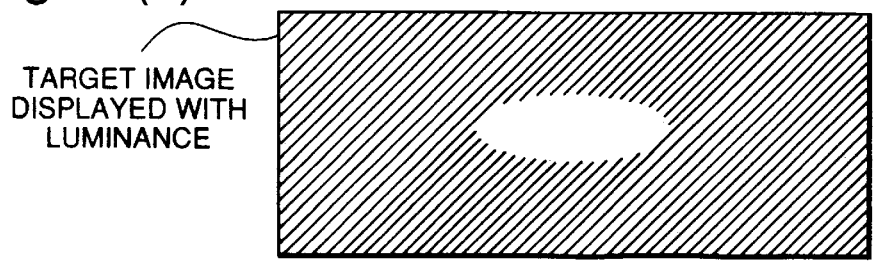

First, there will be described a method of detecting a displacement or a direction (angle) (cf. FIG. 19(a)) of a target (ultrasonic reflector) with respect to the direction of the ultrasonic beam through only one ultrasound transmission and reception process.

Figure 1:
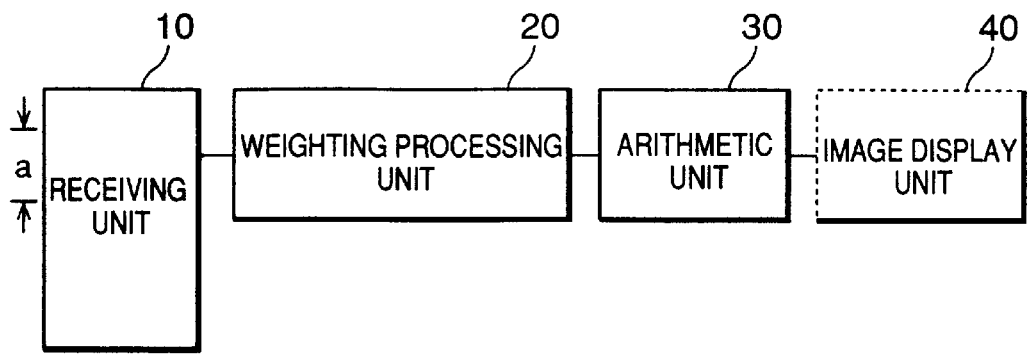
FIG. 1 is a block diagram useful for understanding a principle of a wave receiving apparatus according to the present invention.
Figure 2:
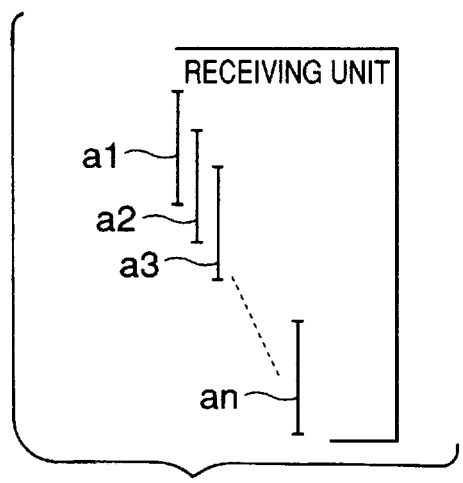
FIG. 2 is an explanatory illustration useful for understanding a receiving section of a wave receiving apparatus according to the present invention.
Figure 3:
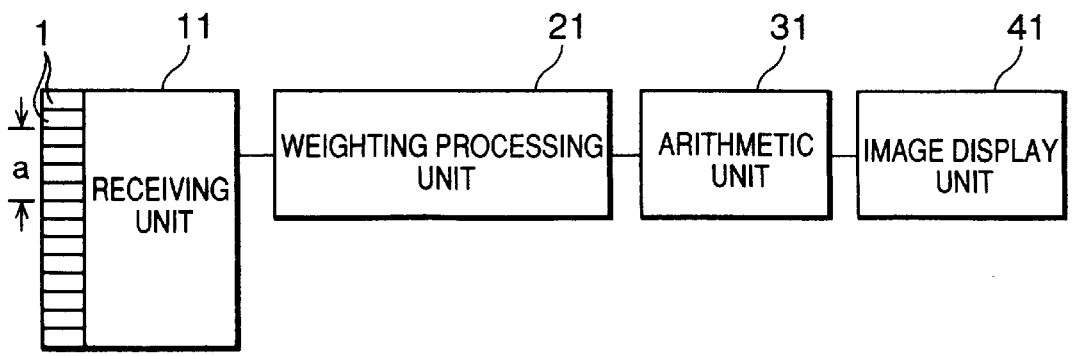
FIG. 3 is a block diagram useful for understanding a principle of an ultrasonic diagnostic apparatus according to the present invention.
Figure 4:
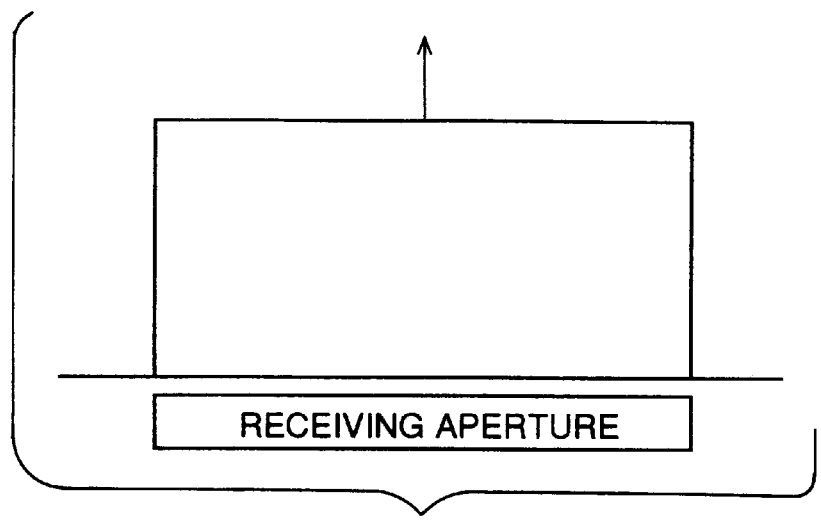
FIG. 4 is a chart showing a weighting function by way of example.
Figure 5:
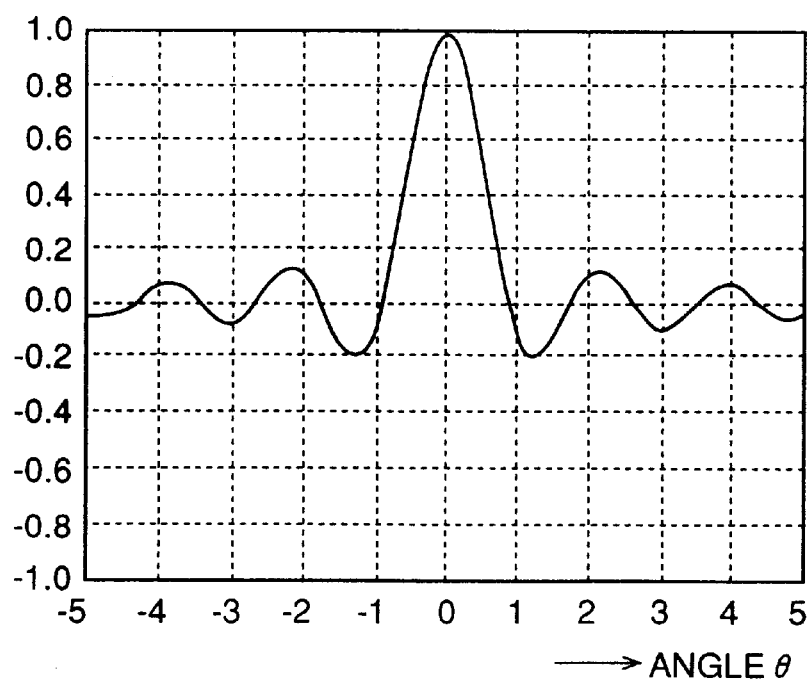
FIG. 5 is a chart showing a beam profile when the weighting function shown in FIG. 4 is used.

FIG. 4 is a chart showing a weighting function by way of example. FIG. 5 is a chart showing a beam profile when the weighting function shown in FIG. 4 is used.

Now, let us consider a rectangular function of bilateral symmetry with respect to the center of the receiving aperture as shown in FIG. 4.

Figure 6:
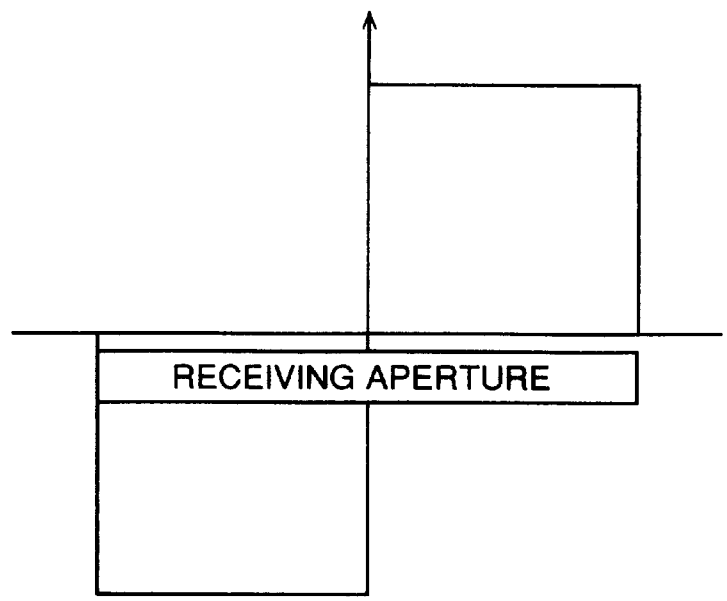
FIG. 6 is a chart showing another weighting function by way of example.
Figure 7:
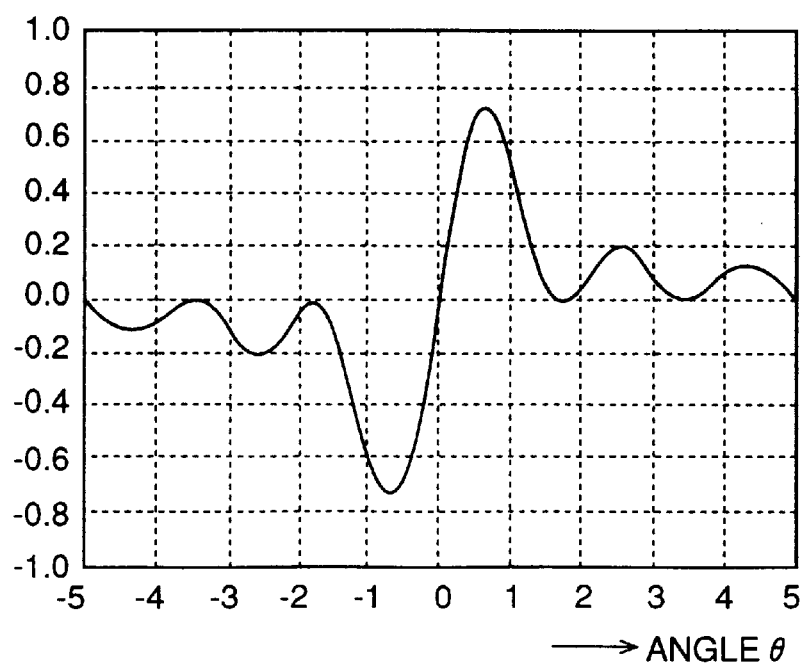
FIG. 7 is a chart showing a beam profile when the weighting function shown in FIG. 6 is used.

A weighting function of an aperture for ultrasounds, and a beam profile of received beams obtained by means of performing a weighting in accordance with the weighting function and then performing the phasing addition, are mutually in a relation of a Fourier transformation pair. Consequently, the beam profile, where the rectangular function shown in FIG. 4 is adopted as the weighting function, is expressed by a sine function $C(\theta)$ given by the following equation (1). It function figure is expressed as shown in FIG. 5.

$$C(\theta) = A \cdot \frac{\sin(2\phi(\theta))}{2\phi(\theta)} \quad (1)$$

$$\phi(\theta) = \frac{\pi a}{2\lambda} \cdot \sin(\theta)$$

where

θ; a direction of a target with respect to a direction of received beam extending A; ultrasound reflection intensity at a target a; aperture width λ; wavelength of ultrasound FIG. 6 is a chart showing another weighting function by way of example. FIG. 7 is a chart showing a beam profile when the weighting function shown in FIG. 6 is used.

Now, let us consider a rectangular function of bilateral symmetry with respect to the center of the receiving aperture, but different in sign from one another, as shown in FIG. 6.

The beam profile, where the rectangular function shown in FIG. 6 is adopted as the weighting function, is expressed by a function $S(\theta)$ given by the following equation (2), and its function figure is expressed as shown in FIG. 7.

$$S(\theta) = A \cdot \frac{1 - \cos(2\phi(\theta))}{2\phi(\theta)} \quad (2)$$

$$\phi(\theta) = \frac{\pi a}{2\lambda} \cdot \sin(\theta)$$

Consider the case where the received signals obtained through one ultrasound transmission and reception process are subjected individually to weighting processes respectively according to the weighting function shown in FIG. 4 and the weighting function shown in FIG. 6. Then, a ratio of the two weighted received signals expressed by equations (1) and (2), which are obtained through the weighting processes, respectively, is determined. In such a case, it is possible to obtain a value $\phi(\theta)$, which is independent of the reflection intensity A of the target, but depends on only the direction θ of the target with respect to the received beam, as shown in the following equations (3) and (4).

$$\frac{S(\theta)}{C(\theta)} = \frac{A \cdot \frac{1 - \cos(2\phi(\theta))}{2\phi(\theta)}}{A \cdot \frac{\sin(2\phi(\theta))}{2\phi(\theta)}} \quad (3)$$

$$= \frac{\frac{\sin(\phi(\theta))}{\phi(\theta)} \cdot \sin(\phi(\theta))}{\frac{\sin(\phi(\theta))}{\phi(\theta)} \cdot \cos(\phi(\theta))}$$

$$= \tan(\phi(\theta))$$

$$\tan^{-1}\left[\frac{S(\theta)}{C(\theta)}\right] = \phi(\theta) \quad (4)$$

In this manner, it is possible to determine a direction of the target with respect to the received beam, that is, a travelling direction of wave referred to in the present invention. This direction is determined by means of weighting the received signal individually using, for example, the weighting function shown in FIG. 4 and the weighting function shown in FIG. 6, and determining a ratio of the two weighted received signals thus obtained.

Next, there will be described a scheme capable of attaining a resolution higher than that which is defined by a profile determined by an aperture width a, a wavelength λ of ultrasound, and a single weighting function.

Figure 8:
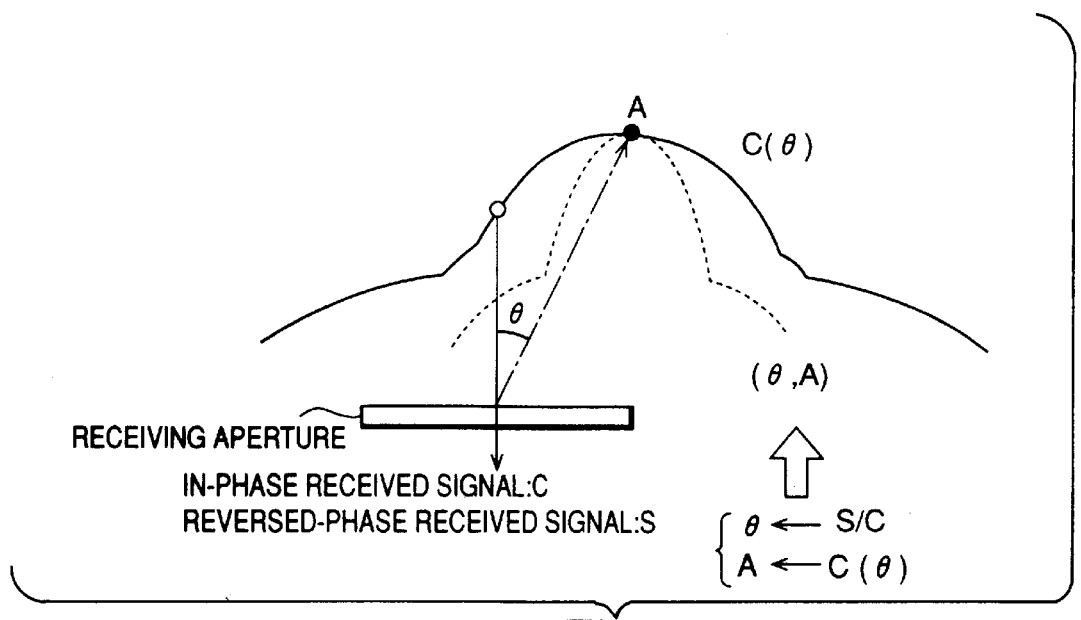
FIG. 8 is an explanatory view useful for understanding a scheme of attaining a high resolution.

FIG. 8 is an explanatory view useful for understanding a scheme of attaining a high resolution.

From equation (1), equation (5) is given as follows.

$$A = \frac{C}{\left[\frac{\sin(2\phi(\theta))}{2\phi(\theta)}\right]} \quad (5)$$

Substituting into the equation (5) the amplitude C of the weighted received signal, which is obtained through the weighting process according to the weighting function shown in FIG. 4, and the function $\phi(\theta)$ representing the direction θ of the target, which is obtained through determining a ratio of the equation (1) and (2), makes it possible to determine a reflection intensity A of the target. Thus, it is possible to determine both the direction θ of the target according to equation (4) and the reflection intensity A of the target according to equation (5).

Further the direction θ of the target and the reflection intensity A of the target can be substituted into a function g (θ, A) for attaining a beam profile narrower than a function (here the sine function C (θ) expressed by equation (1)) representative of a beam profile. These substitutions make it possible to derive a signal equivalent to the received signal when received with the beam profile g (θ, A) narrower in diameter than the beam profile C (θ) obtained through the weighting process using a uniform weighting function shown in FIG. 4.

For example, as the function g (θ, A), if the function expressed by the following equation (6) is adopted, it is possible to obtain a profile having half of a diameter of the beam profile C (θ) given by equation (1). In other words, it is possible to obtain twice the resolution.

$$g(\theta, A) = A \cdot \frac{\sin(4\phi(\theta))}{4\phi(\theta)} \quad (6)$$

$$\phi(\theta) = \frac{\pi a}{2\lambda} \cdot \sin(\theta)$$

According to the ultrasonic diagnostic apparatus of the earlier development, it is possible to know a distance between the target and the aperture through a time interval from the transmitting timing of ultrasound to the receiving timing. Further, of the ultrasonic diagnostic apparatus according to the present embodiment, it is possible to know a direction of the target through one ultrasound transmission and reception process. Hence, it is possible to identify not only the direction of the target, but also the position of the target as far as a sufficient amplitude of received signal can be obtained. Consequently, it is possible to obtain, through an arithmetic operation based on a received signal obtained by means of actually transmitting and receiving ultrasonic beams, an interpolation signal corresponding to a received signal. This interpolation signal is derived in such a way that the ultrasonic beams are transmitted and received with an aperture, which is slightly shifted from the aperture with which the ultrasonic beams are actually transmitted and received. For example, this may be an aperture lying halfway between the adjacent two apertures. Generation of such an interpolation signal makes it possible to reduce a time required for the scan, thereby improving a frame rate, without making sacrifices for resolution.

Hereinafter, various types of weighting function pairs will be exemplarily explained.

Figure 9:
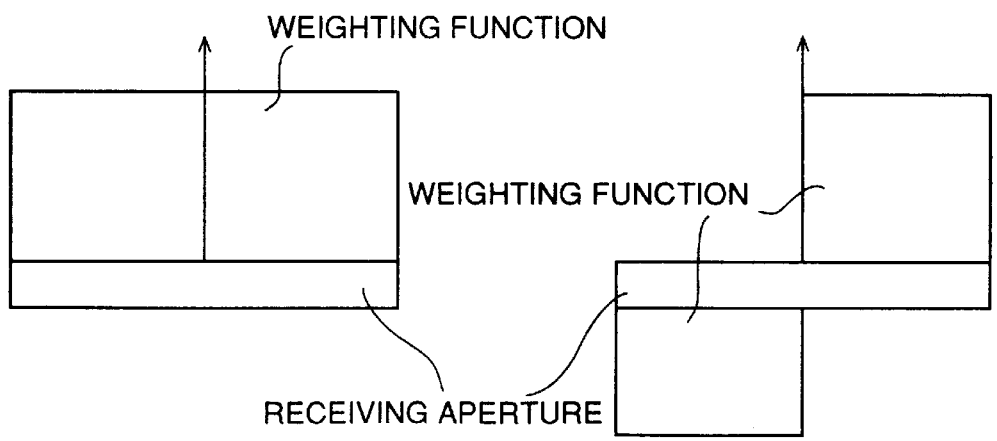
FIGS. 9(a) and (b) are each a chart showing a first example of a weighting function pair.

FIGS. 9(a) and (b) are each a chart showing a first example of a weighting function pair.

FIGS. 9(a) and (b) are involved in the weighting function pairs which were explained referring to FIGS. 4 to 7. FIG. 9(a) is a rectangular even function of weighting function of bilateral symmetry with respect to the center of the receiving aperture. FIG. 9(b) is a rectangular odd function of weighting function of bilateral symmetry with respect to the center of the receiving aperture, but different in sign from one another. When a ratio of two weighted received signals, which are obtained through the weighting processes according to the weighting functions shown in FIGS. 9(a) and (b), respectively, is determined, it is possible to obtain a value which depends on the direction of the target with respect to the received beam.

With respect to providing two weighting functions on an aperture for forming a beam, the essentially same effect can be expected regardless of the two weighting functions being on a transmitting aperture or a receiving aperture. While providing the two weighting functions on the transmitting aperture needs twice transmission of ultrasound, providing the two weighting functions on the receiving aperture merely needs once transmission of ultrasound. Further, since the transmission side deals with high voltages, providing the two weighting functions on the transmitting aperture would involve more difficult problems as compared with providing the two weighting functions on the receiving aperture. Furthermore, providing the two weighting functions on the transmitting aperture brings about a disturbance of ultrasounds within the subject thereby reducing the effect. Thus, in any points of view of a viewpoint such that a frame rate is improved, a technical viewpoint and a viewpoint as to the effect, it is preferable that the two weighting functions are provided on the receiving aperture.

FIGS. 10(a) and (b) are each a chart show ing a second example of a weighting function pair.

FIG. 10(a) is a triangular function in which the maximum is given at the center of the aperture, be gradually decreased toward both the ends of the aperture, and finally becoming zero at both the ends of the aperture. FIG. 10(b) is a rectangular function of bilateral symmetry with respect to the center of the receiving aperture, but different in sign from one another. FIG. 10(b) is given with a figure in which FIG. 10(a) is subjected to a first order differentiation.

As mentioned above, it is known that a weighting function of an aperture for ultrasounds and a beam profile function of received beams obtained by means of performing a weighting in accordance with the weighting function and then performing the phasing addition are mutually in a relation of Fourier transformation pair. In the event that the weighting function of FIG. 10(a) is given by f(x), the associated beam profile function is given by F(w) which is Fourier transformation of f(x), where w denotes a displacement of the target with respect to a beam direction.

Further, it is known that Fourier transformation of function f(x), which is a first order differentiation of function f(x), is expressed by jw·F(w) (j is an imaginary unit), and thus the beam profile function of FIG. 10(b) is given by jw·F(w). Consequently, it is possible to directly determine the displacement w by means of determining a ratio of the received signal according to FIG. 10(a) and the received signal according to FIG. 10(b).

FIGS. 11(a) and (b) are each a chart showing a third example of a weighting function pair.

A relation of FIGS. 11(a) and (b) is, in a similar fashion to that of the second example, that FIG. 11(b) is given with a figure in which FIG. 11(a) is subjected to a first order differentiation. As preferable functions of FIG. 11(a), there is cited Gaussian function, the raised cosine, the offset raised cosine and the like.

Figure 12A:
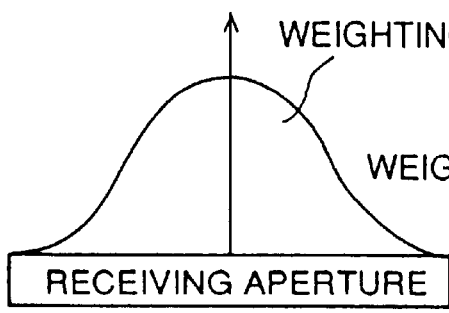
FIGS. 12(a) and (b) are each a chart showing a fourth example of a weighting function pair.

FIGS. 12(a) and (b) are each a chart showing a fourth example of a weighting function pair.

Figure 12B:
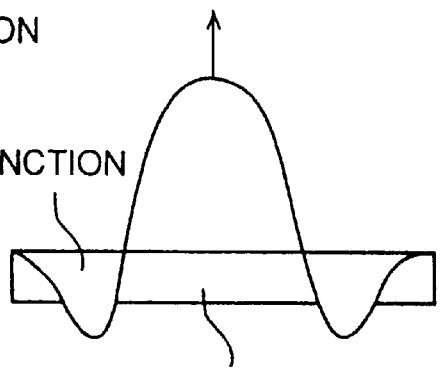

A relation of FIGS. 12(a) and (b) is that FIG. 12(b) is given with a figure in which FIG. 12(a) is subjected to a second order differentiation. The beam profile of FIG. 12(b) is given by a function $-w^2 \cdot F(w)$. Consequently, $w^2$ is found by means of determining a ratio of the received signal according to FIG. 12(a) and the received signal according to FIG. 12(b), and then it is possible to determine a displacement w by means of finding the square root of $w^2$.

Figure 13:
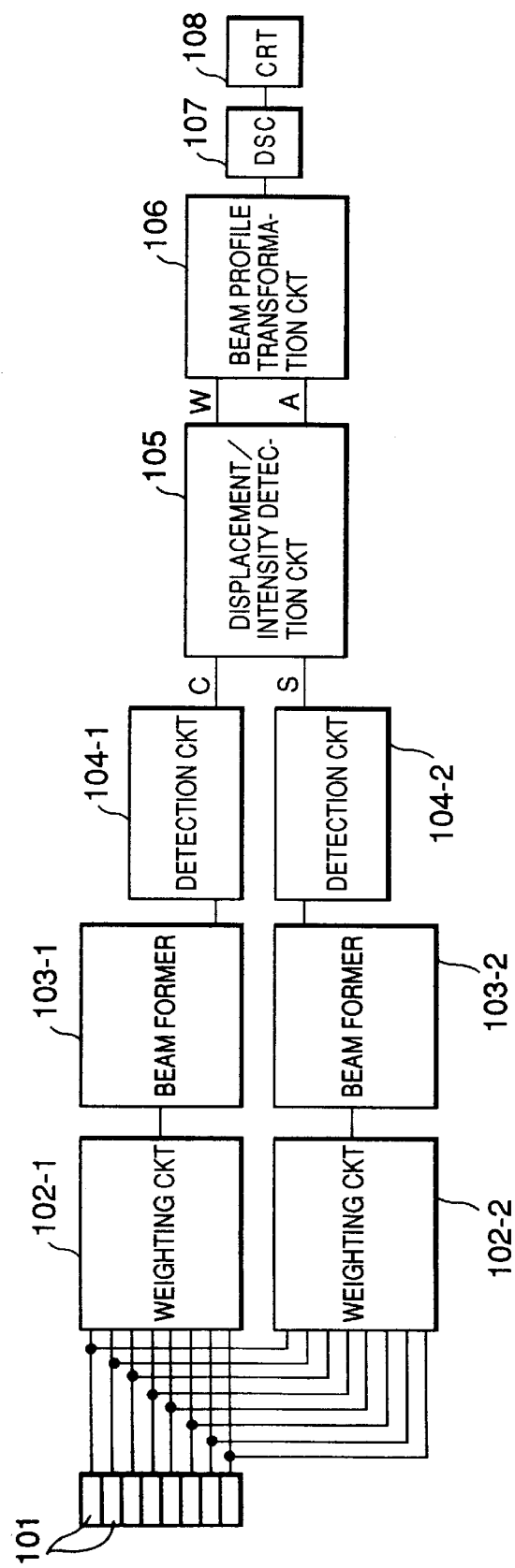
FIG. 13 is a block diagram of an ultrasonic diagnostic apparatus according to a first embodiment of the present invention.

FIG. 13 is a block diagram of an ultrasonic diagnostic apparatus according to a first embodiment of the present invention.

According to the first embodiment of the present invention, there is shown an circuit arrangement capable of obtaining a higher resolution than that according to the beam profile which is determined by an aperture width, a wavelength of ultrasounds and a weighting function. For the purpose of simplification of the drawing and the explanation, FIG. 13 and the following figures related to another embodiment shows simply ultrasonic transducers constituting one aperture of a number of ultrasonic transducers arranged.

Ultrasound is transmitted from ultrasonic transducers 101 toward the inside of the subject using an ultrasonic transmission circuit (not shown), and ultrasounds reflected inside the subject are received by the ultrasonic transducers 101. Ultrasonic signals generated by the ultrasonic transducers 101 are separated into two systems, and are regulated in amplification in accordance with the associated weighting functions constituting a weighting function pair in weighting circuits 102_1 and 102_2, respectively. The received signals thus regulated are beamformed by beamformers 103_1 and 103_2, respectively, and thereafter are subjected to an envelope detection in detection circuits 104_1 and 104_2, respectively, thereby obtaining scanning line signals C and S. The scanning line signals C and S are fed to a displacement/intensity detection circuit 105 for detecting a displacement of the target and a reflection intensity, so that a displacement w and a reflection intensity A are determined. The displacement w and the reflection intensity A are fed to a beam profile transformation circuit 106 so as to obtain a new scanning line signal according to a beam profile function narrower in beam diameter. The new scanning line signal is fed to a DSC (Digital Scan Converter) 107 in which an inter-scanning line interpolation is implemented, and then displayed in CRT 108.

Figure 14:
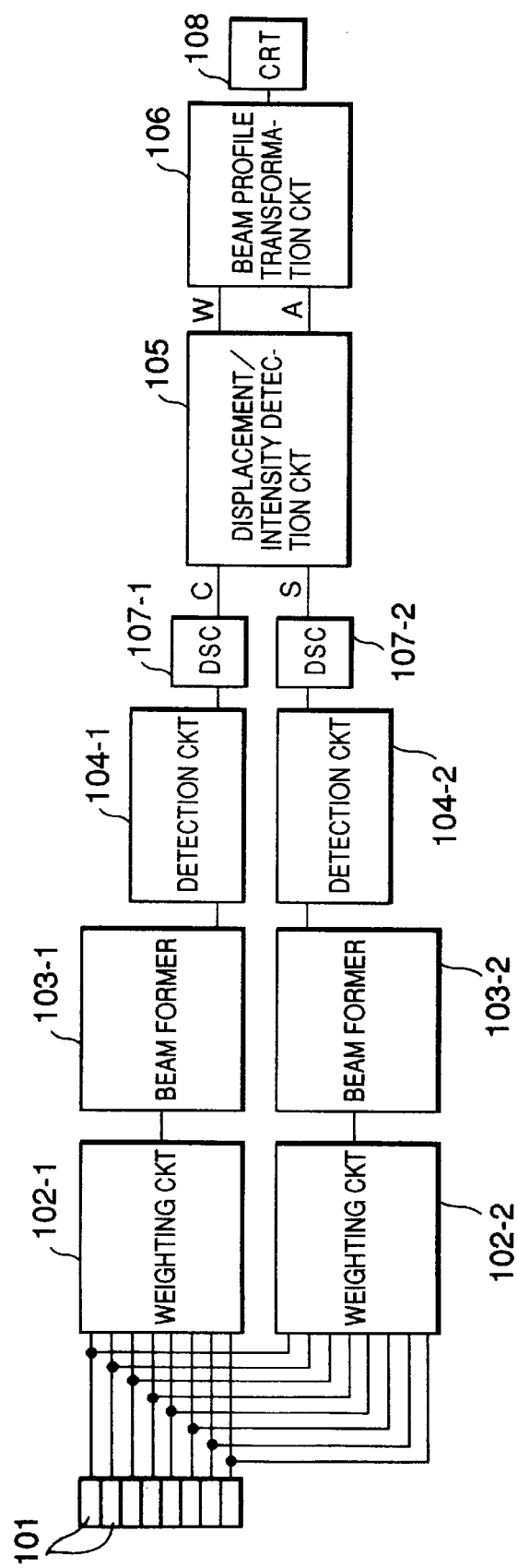
FIG. 14 is a block diagram of an ultrasonic diagnostic apparatus according to a second embodiment of the present invention.

FIG. 14 is a block diagram of an ultrasonic diagnostic apparatus according to a second embodiment of the present invention.

A different point from the first embodiment shown in FIG. 13 will be described.

In the second embodiment shown in FIG. 14, DSCs 107_1 and 107_2 are disposed before the displacement/intensity detection circuit 105. Thus, the scanning line interpolation is implemented in the DSCs 107_1 and 107_2, and thereafter a displacement of the target and a reflection intensity are detected.

The second embodiment is preferable when the weighting function pair shown in FIGS. 9(a) and (b) is used.

Figure 15:
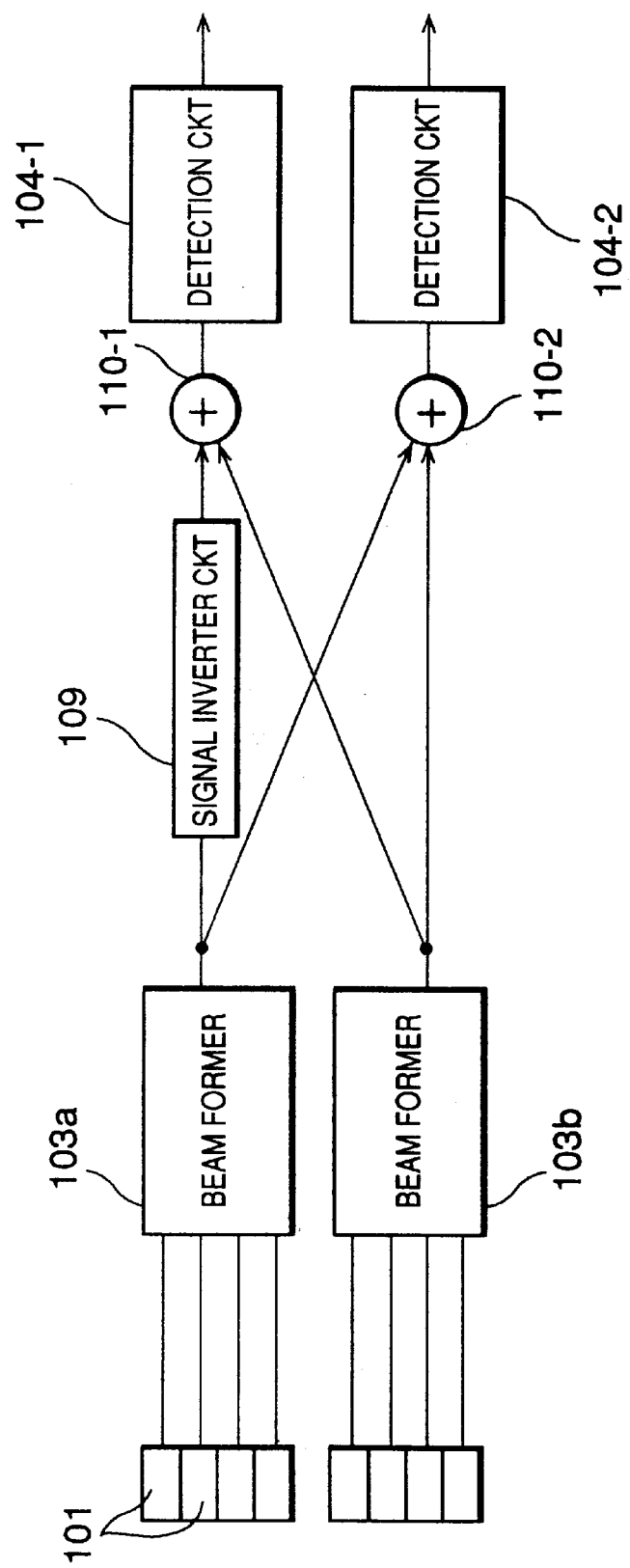
FIG. 15 is a block diagram of an ultrasonic diagnostic apparatus according to a third embodiment of the present invention.

FIG. 15 is a block diagram of an ultrasonic diagnostic apparatus according to a third embodiment of the present invention.

Ultrasonic signals derived from the ultrasonic transducers arranged upper half of the ultrasonic transducers 101 are fed to a beamformer 103a to be beamformed, while ultrasonic signals derived from the ultrasonic transducers arranged lower half of the ultrasonic transducers 101 are fed to a beamformer 103b to be beamformed.

Received signals subjected to the beamforming process by the beamformer 103a are inverted by a signal inverter 109 and then fed to an adder 110_1. On the other hand, the received signals subjected to the beamforming process by the beamformer 103a are directly fed to another adder 110_2. Further, received signals subjected to the beamforming process by the beamformer 103b are directly fed to two adders 110_1 and 110_2. In each of the adders 110_1 and 110_2, two received signals are added together. Outputs of the adders 110_1 and 110_2 are fed to detector circuits 104_1 and 104_2, respectively. The subsequent processing is similar to the matter of FIG. 13 or FIG. 14.

The beamformers 103a and 103b shown in FIG. 15 are associated with the upper half and the lower half of the arranged ultrasonic transducers 101. Hence, a combination of both the beamformers 103a and 103b corresponds to one of the beamformers 103_1 and 103_2 shown in FIG. 13 or FIG. 14.

Therefore, according to the present embodiment, there is no need to prepare two systems of beamformers, and thus it is possible to implement a substantial reduction in cost as compared with the embodiments shown in FIG. 13 and FIG. 14.

The above-mentioned matters concern the various type of embodiments of the ultrasonic diagnostic apparatus of the wave receiving apparatus according to the present invention. It is noted, however, that the wave receiving apparatus according to the present invention is applicable to another type of apparatus other than the ultrasonic diagnostic apparatus. Hereinafter, there will be described examples in which the wave receiving apparatus according to the present invention is applicable to apparatuses or systems other than the ultrasonic diagnostic apparatus.

In radars, which will be set up on the ground, on an airplane, on land or the like to detect an airplane, shipping and the like, especially, there is a bistatic rader system in which a transmitter station and a receiver station are separately set up. The present system is to detect a target existing in a spatial area defined by an intersection of a transmit beam and a receive beam.

Figure 16:
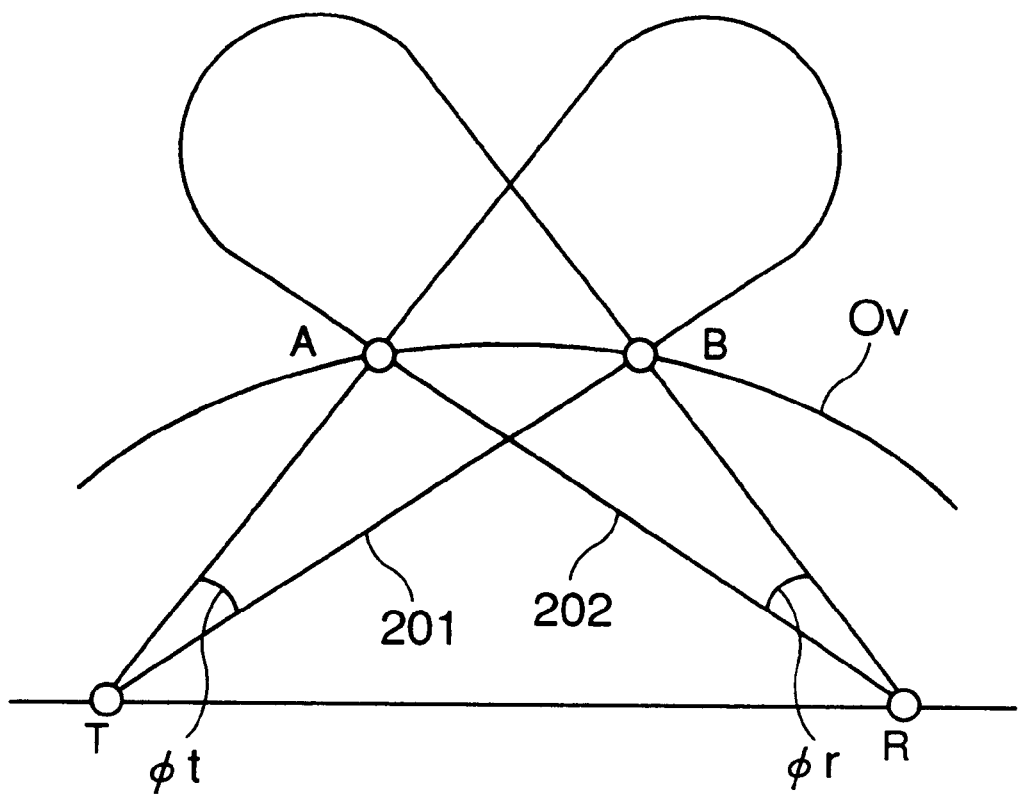
FIG. 16 is a typical illustration useful for understanding a state that transmit beam is radiated from a transmitter station and reflected waves from a target are received by a receiver station.

FIG. 16 is a typical illustration useful for understanding a state that transmit beam 201 is radiated from a transmitter station T and reflected waves from a target are received by a receiver station R.

Hitherto, there is known a scheme referred to as a "pulse choice" in which a receive beam is scanned at high speed in accordance with a travelling of a transmit energy of a transmit beam, for the purpose of retrieval for a space utilizing effectively the transmit energy.

As shown in FIG. 16, a locus of a target position received at the receiver station R at the same time is expressed by an ellipse $O_y$ wherein the transmitter station and the receiver station are given in the form of a focal point. Assuming that points through which the transmit beam 201 crosses the ellipse $O_y$ are denoted by points A and B, in order to completely retrieve the transmit beam irradiation area, there is a need to expand a width of the receive beam to such a degree that angle $\phi$ r of the receive beam 202 is not less than angle $\phi$ t of the transmit beam 201. Consequently, in the event that the transmit beam 201 is expanded, there is a need to also expand the receive beam 202 to the corresponding beam width. This causes such a problem that the target resolution and the position accuracy are deteriorated.

In view of the foregoing, a wave receiving apparatus according to the present invention is applied to such a radar.

Figure 17:
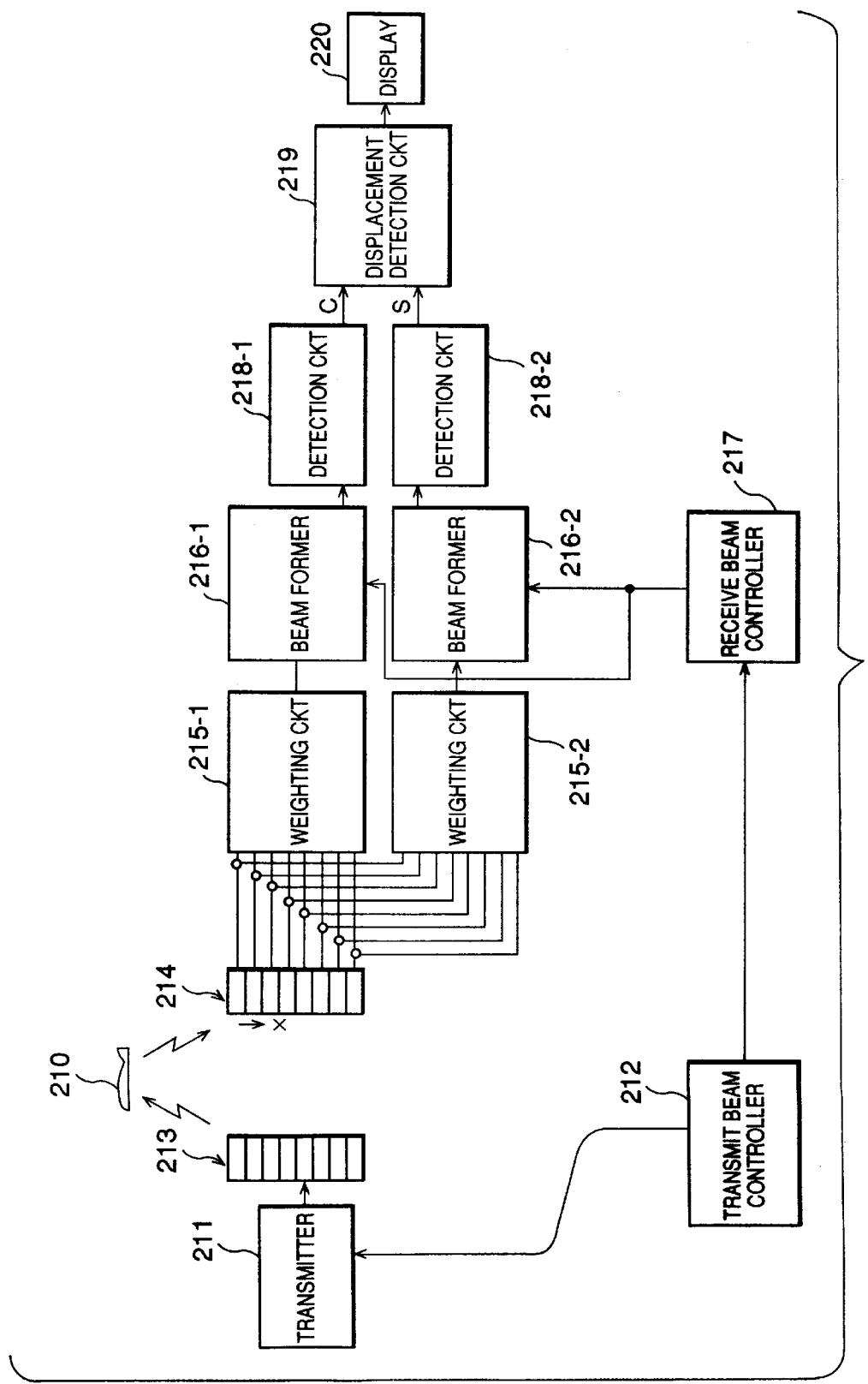
FIG. 17 is a block diagram of a radar in which a wave receiving apparatus according to the present invention is applied.

FIG. 17 is a block diagram of a radar to which a wave receiving apparatus according to the present invention is applied.

A transmitter 211 transmits a predetermined transmit beam from a transmit antenna under control of a transmit beam controller 212. A reflected wave from a target 210 is received by a receive antenna 214. The receive antenna 214 is partitioned into a plurality of pieces in an x-direction as shown in FIG. 17 so as to derive the respective received signals. Each of the received signals is subjected to weighting processes according to the associated weighting functions constituting a weighting function pair in two weighting circuits 215_1 and 215_2, respectively, and then fed to beamformers 216_1 and 216_2 so as to be beamformed. In the beamforming processes, a receive beam controller 217 controls the beamformers 216_1 and 216_2 in accordance with information as to a transmit timing of the transmit beam, a transmit direction and the like derived from the transmit beam controller 212 so that the receive beam is formed in a direction according to the transmit beam.

Signals derived through beamforming by the beamformers 216_1 and 216_2 are fed to detection circuits 218_1 and 218_2, respectively, to be subjected to an envelop detection thereby deriving scanning line signals C and S. The scanning line signals C and S thus obtained are fed to a displacement detection circuit 219 to derive displacement or direction of the target from the receive beam. Information as to the displacement of the target from the receive beam, or the position information of the target, which is derived in the displacement detection circuit 219, is fed to a display 220 so as to display a position of the target.

Figure 18:
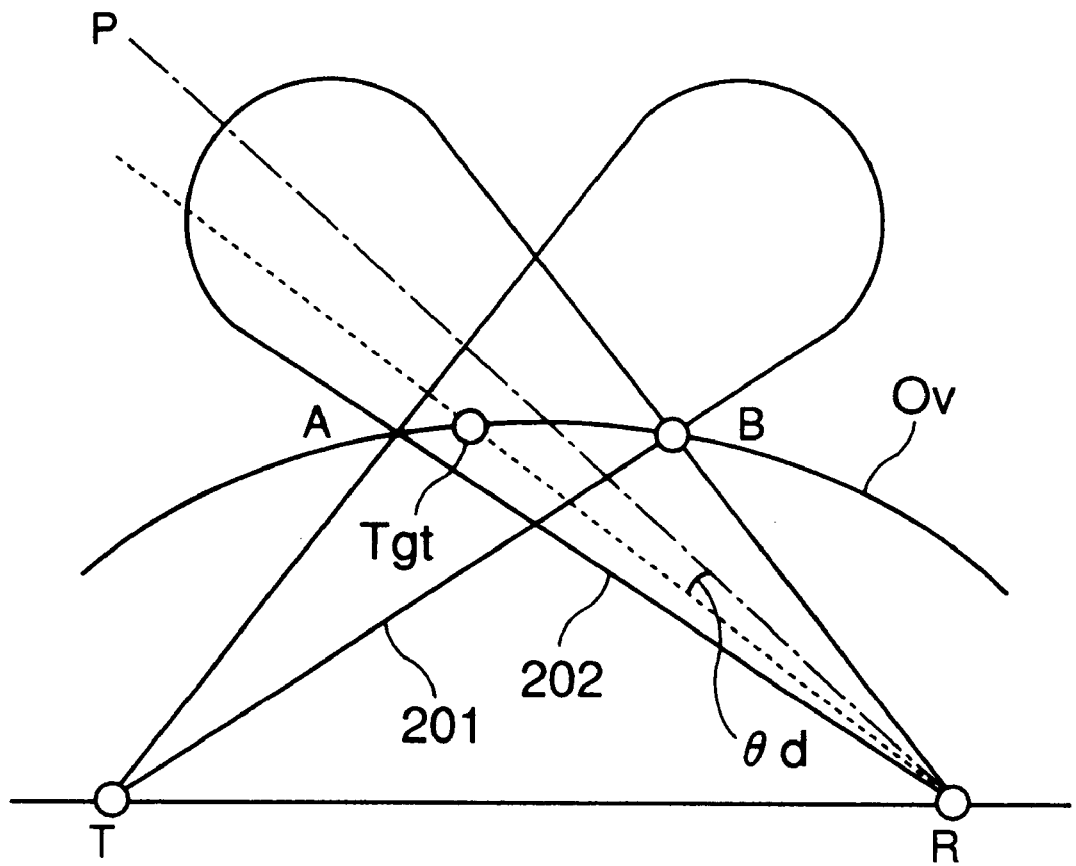
FIG. 18 is an explanatory view useful for understanding an effect of the radar shown in FIG. 17.

FIG. 18 is an explanatory view useful for understanding an effect of the radar shown in FIG. 17.

According to the radar shown in FIG. 17, it is possible to know a direction angle θ d of a target Tgt with respect to a direction P of the receive beam 202 for example, thereby exactly identify a locating point of the target Tgt on the ellipse determined by a distance between the transmitter station and the receiver station and an arrival time of the reflected wave. Consequently, it is possible to identify with greater accuracy a position of the target without involving deterioration of the target resolution and the position precision, even if there is provided broader transmit beam and receive beam in order to completely retrieve a wide spatial area.

While the present invention has been explained referring to the ultrasonic diagnostic apparatus and the rader by way of example as mentioned above, it is to be noted that the wave receiving apparatus according to the present invention is applicable also to for example, a fish detector for detecting the position of fishes in the water, and a flaw detector for detecting flaws inside an object. And in addition, there is a possibility that the wave receiving apparatus according to the present invention is applicable also to for example, a system for identifying the epicenter of an earthquake.

As mentioned above, according to the present invention, it is possible to detect a direction or displacement of the target through once receiving by a predetermined aperture at an arbitrary position. And further it is possible to attain a higher resolution, and also to generate through an arithmetic processing a signal corresponding to a received signal associated with an aperture which does not actually receive any signal.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An ultrasonic diagnostic apparatus, comprising:

a receiving unit receiving ultrasound arriving at a detection region defined by a plurality of ultrasonic transducers disposed at respective positions;

a weighting processing unit for performing a weighting process for received signals derived in said receiver unit with a plurality of types of weighting functions where an arrangement order of the plurality of ultrasonic transducers is represented by a variable;

an arithmetic unit for performing an operation including an arithmetic operation in which a direction or a position of an ultrasonic reflection source within the subject is evaluated in accordance with a plurality of weighted received signals derived through the weighting process of said weighting processing unit, and further generates an image signal representative of an image within the subject based on an operating result obtained when the weighting process is repeated; and an image display unit for displaying an image based on the image signal generated in said arithmetic unit.

* * * * *